(12) United States Patent
Onda et al.

(10) Patent No.: US 11,599,631 B2
(45) Date of Patent: Mar. 7, 2023

(54) SEMICONDUCTOR DEVICE, SEMICONDUCTOR SYSTEM AND PROGRAM

(71) Applicant: RENESAS ELECTRONICS CORPORATION, Tokyo (JP)

(72) Inventors: Kazuki Onda, Tokyo (JP); Masamitsu Muratani, Tokyo (JP); Hiroshi Yagi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 738 days.

(21) Appl. No.: 16/577,508

(22) Filed: Sep. 20, 2019

(65) Prior Publication Data
US 2020/0143048 A1  May 7, 2020

(30) Foreign Application Priority Data
Nov. 2, 2018 (JP) .............................. JP2018-207093

(51) Int. Cl.
| | |
|---|---|
| *G06F 12/14* | (2006.01) |
| *G06F 21/55* | (2013.01) |
| *G06F 3/06* | (2006.01) |
| *G06F 21/71* | (2013.01) |

(52) U.S. Cl.
CPC ............ *G06F 21/554* (2013.01); *G06F 3/065* (2013.01); *G06F 3/0653* (2013.01); *G06F 3/0679* (2013.01); *G06F 12/14* (2013.01); *G06F 21/71* (2013.01); *G06F 2221/034* (2013.01)

(58) Field of Classification Search
CPC ...... G06F 3/0679; G06F 3/065; G06F 3/0653; G06F 12/14; G06F 21/554; G06F 21/71; G06F 2221/034
USPC ....................................................... 711/163
See application file for complete search history.

(56) References Cited

U.S. PATENT DOCUMENTS

| | | | |
|---|---|---|---|
| 2013/0031386 A1* | 1/2013 | Tanaka .................. | G06F 1/3243 713/300 |
| 2017/0104881 A1* | 4/2017 | Hashimoto ........ | H04N 1/00503 |

FOREIGN PATENT DOCUMENTS

| | | |
|---|---|---|
| JP | 11-338783 A | 12/1999 |
| JP | 2004-348546 A | 12/2004 |

* cited by examiner

*Primary Examiner* — Hua J Song
(74) *Attorney, Agent, or Firm* — McDermott Will & Emery LLP

(57) ABSTRACT

A semiconductor device and the like for maintaining a required function while suppressing unauthorized accesses are provided. The semiconductor device 100 includes a main control device 110 and a sub-control device 120. The main control device 110 includes a main memory 112 for storing main programs for receiving external signals, and a trigger signal output circuit 115 for outputting a trigger signal when an abnormal signal process differs from preset signal processing is performed. The sub-control device 120 is coupled to the main control device 110, and includes a trigger signal obtaining circuit 121 for obtaining a trigger signal, and a sub-program outputting circuit 123 for outputting a sub-program to the main control device 110 based on the obtained trigger signal.

19 Claims, 13 Drawing Sheets ated with by the unauthorized access. That is, the reliability of the software stored in the semiconductor device itself cannot be ensured. However, in the device described in Japanese unexamined Patent Application publication 11/338,783, if there is an unauthorized access to the storing unit that stores the control program, there is a possibility that there is an unauthorized access to another control program, so that it cannot be said that the reliability is secured. In addition, the device described in Patent Document 1 prohibits the operation of the main microcomputer after unauthorized accesses, and therefore cannot continue the functions of the device thereafter.

SEMICONDUCTOR DEVICE, SEMICONDUCTOR SYSTEM AND PROGRAM

CROSS-REFERENCE TO RELATED APPLICATIONS

The disclosure of Japanese Patent Application No. 2018-207093 filed on Nov. 2, 2018 including the specification, drawings and abstract is incorporated herein by reference in its entirety.

BACKGROUND

The present disclosure relates to a semiconductor device, a semiconductor system, and a program.

The Background of the Invention

In recent years, various devices have a function of communicating with the outside, such as Internet connection. Having a communication function with the outside facilitates updating of software and sharing of data, but presents a problem of danger due to unauthorized access from a third party or the like. For this reason, a device and a system having a function of communicating with the outside are required to avoid the dangers caused by unauthorized accesses.

For example, a function called memory protection (or area protection) is implemented in the semiconductor device. The memory protection has a function of detecting an access different from an access to a preset address space, that is, an unauthorized access. The user of the semiconductor device can use the detection of unauthorized accesses as a trigger to protect the system on which the semiconductor device is mounted.

More specifically, when the consistency of the control program stored in the microcontroller is not verified, the program switching device described in, for example, Japanese unexamined Patent Application publication 2004-348546 executes another control program stored in the microcomputer. Further, the device described in Japanese unexamined Patent Application publication 11/338,783 has a function of prohibiting the operation of the main microcomputer when the sub-microcomputer for monitoring unauthorized accesses detects abnormalities in the nonvolatile memories.

SUMMARY

If the semiconductor device receives unauthorized access, it may have been tampered with by the unauthorized access. That is, the reliability of the software stored in the semiconductor device itself cannot be ensured. However, in the device described in Japanese unexamined Patent Application publication 11/338,783, if there is an unauthorized access to the storing unit that stores the control program, there is a possibility that there is an unauthorized access to another control program, so that it cannot be said that the reliability is secured. In addition, the device described in Patent Document 1 prohibits the operation of the main microcomputer after unauthorized accesses, and therefore cannot continue the functions of the device thereafter.

Other objects and novel features will become apparent from the description of this specification and the accompanying drawings.

According to one embodiment, the semiconductor device comprises a main control device and a sub-control device. The main control device includes a main memory for storing main programs for receiving external signals, and trigger signal output circuits for outputting a trigger signal when abnormal signal processing differing from preset signal processing is performed. The sub-control device is connected to the main control device, and includes a trigger signal obtaining circuit for obtaining the trigger signal, and a sub-program outputting circuit for outputting a sub-program to the main control device based on the obtained trigger signal.

According to one embodiment, a plurality of semiconductor device having a main control device and a sub-control device are communicably connected to each other, and one semiconductor device of the plurality of semiconductor device transmits a notification based on a trigger signal to another semiconductor device.

According to one embodiment, the program causes the computer to perform semiconductor device protecting methods. The semiconductor device protecting process comprises a trigger signal outputting step for outputting a trigger signal to the sub-control device when the signal processing differs from the preset signal processing in the main control device. In addition, the semiconductor device protecting process includes a subprogram output step for outputting a subprogram to the main control device based on the trigger signals in the sub-control device.

According to the above-mentioned embodiment, it is possible to provide a semiconductor device or the like for maintaining a required function while suppressing unauthorized accesses.

DETAILED DESCRIPTION

Figure 1:
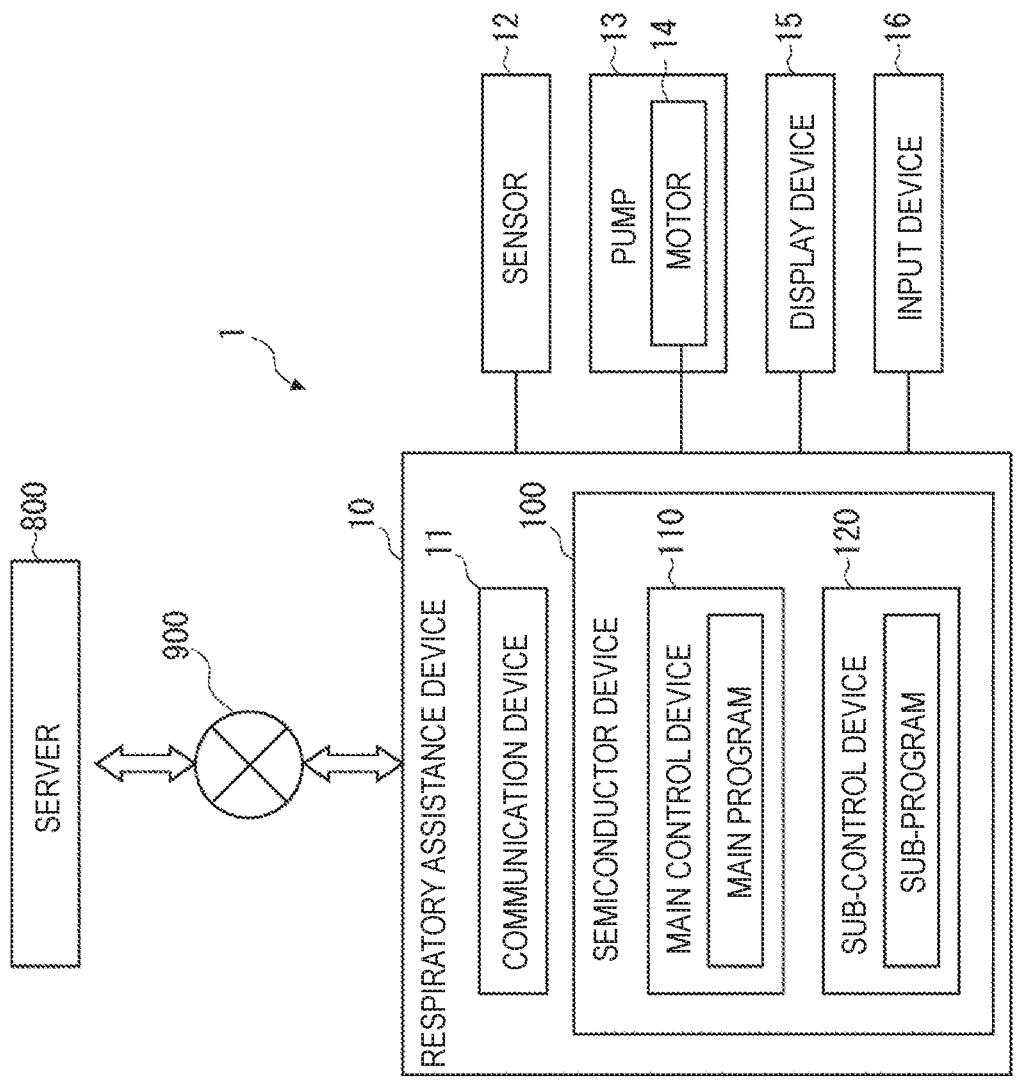
FIG. 1 is a diagram of a respiratory assistance system according to first embodiment.

For clarity of explanation, the following description and drawings are appropriately omitted and simplified. In addition, the elements described in the drawings as functional blocks for performing various processes can be configured as a CPU (Central Processing Unit), a memory, and other circuits in terms of hardware, and are realized by programs loaded into the memory in terms of software. Therefore, it is understood by those skilled in the art that these functional blocks can be realized in a variety of ways forms by hardware alone, software alone, or a combination thereof, and the present invention is not limited to any of them. In the drawings, the same elements are denoted by the same reference numerals, and a repetitive description thereof is omitted as necessary.

Referring to the drawings, the first embodiment will be described below. FIG. 1 is a diagram of a respiratory assistance system according to first embodiment. The respiratory assistance system 1 shown in FIG. 1 is a device used to assist the respiratory operation of a patient in a condition in which the patient is in a state in which it is difficult to breathe by himself/herself. The breathing assistance system 1 has a communication function, and is communicably connected to the server 800 via the network 900. An administrator who manages the breathing assistance system 1 can manage information on the state of the breathing assistance system 1 acquired by the server 800. The administrator can also update the program of the breathing assistance system 1 using the server 800.

The respiratory assistance system 1 mainly includes a respiratory assistance device 10, a sensor 12, a pump 13, a display device 15, and an input device 16. First, the sensor 12, the pump 13, the display device 15, and the input device 16 will be described.

The sensor 12 acquires information required for operating the respiratory assistance system 1, and supplies the acquired information to the respiratory assistance device 10. The information acquired by the sensor 12 includes a plurality of pieces of information such as the operating state such as the rotation speed of the pump 13 or the breathing intensity of the patient.

The pump 13 is a pump device for assisting the patient in breathing. The pump 13 has an inlet port, an exhaust port and a motor 14. The motor 14 is interposed between the inlet port and the exhaust port, and delivers the air sucked from the inlet port to the exhaust port. The motor 14 is connected to the respiratory assistance device 10 and operates in response to instructions from the respiratory assistance device 10.

The display device 15 is, for example, a display device having a display unit and display a driving circuit for driving the display unit. The display device 15 displays, for example, the operating state of the respiratory assistance system 1, the state of the patient acquired via the sensor 12, and the like. The input device 16 includes, for example, a keyboard, a touch panel, a switch, and the like, and receives instructions from a user who uses the respiratory assistance device 10.

Next, the respiratory assistance device 10 will be described. The respiratory assistance device 10 mainly includes a communication device 11 and a semiconductor device 100. The respiratory assistance device 10 is connected to the sensor 12, the pump 13, the display device 15, and the input device 16 in a wired or wireless manner.

The communication device 11 is a device that performs external communication with the outside of the respiratory assistance system 1. The external communication is an operation of transmitting and/or receiving information in accordance with procedures determined to be outside the device or board in which the communication device 11 is included, and does not include communication of the input/output device constituting the device. That is, the communication device 11 accesses the network 900 and transmits and receives predetermined data. The communication device 11 performs external communication in cooperation with the semiconductor device 100. The network 900 is, for example, a telephone line, which is a public network line, or an Internet line. The communication device 11 and the network 900 may be wired or wirelessly connected to each other.

The semiconductor device 100 controls the operations and functionals of the components of the respiratory assistance system 1. The semiconductor device 100 mainly includes a main control device 110 and a sub-control device 120. The main control device 110 is an arithmetic device including a CPU (Central Processing Unit). The main control device 110 stores a main program, and sends instructions and receives data to the respective components in accordance with the process of the main program. The sub-control device 120 is an arithmetic device called an MPU (Micro Controller Unit). The sub-control device 120 stores a sub-program which is a spare program, connects the sub-program to the main control device 110, and supplies the sub-program to the main control device 110 when it comes to a preset condition.

The semiconductor device 100 is, for example, an integrated circuit chip in which a main control device 110 and a sub-control device 120 are independent of each other, and the integrated circuit chip is formed on a single substrate. Further, the semiconductor device 100 may be, for example, a PoP (Package on Package) in which the main control device 110 and the sub-control device 120 are chips of independent integrated circuits, and each of the integrated circuits is further stacked as one chip. Since the main control device 110 has a function of realizing external communication, it may be received unauthorized accesses as described above. On the other hand, it is preferable that the sub-control device 120 does not have a wire for controlling external communication. In addition, it is preferable that the sub-control device 120 does not have wires that are affected by unauthorized accesses even in communication with the main control device 110.

Figure 2:
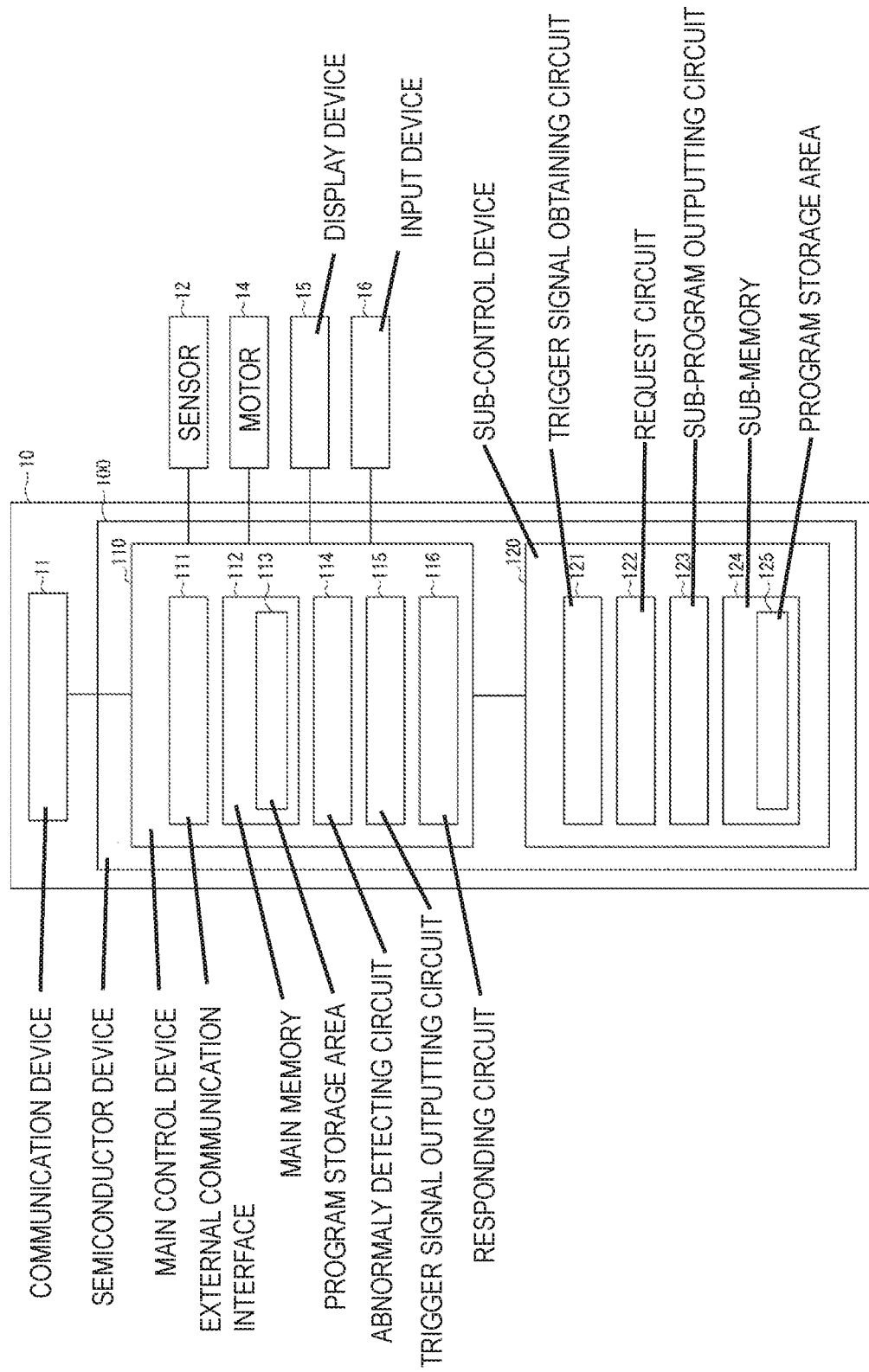
FIG. 2 is a schematic configuration diagram of the semiconductor device according to the first embodiment.

Next, referring to FIG. 2, the semiconductor device 100 included in the respiratory assistance device 10 will be described in detail. FIG. 2 is a schematic configuration diagram of the semiconductor device according to the first embodiment. The main control device 110 is connected to the communication device 11 and controls external communication performed by the communication device 11. The main control device 110 is connected to the sensor 12, the motor 14, the display device 15, and the input device 16 to transmit and receive signals as appropriate.

The main control device 110 includes, as main components, external communication interfaces 111, a main memory 112, an anomaly detecting circuit 114, a trigger signal outputting circuit 115, and a responding circuit 116. The external communication interface 111 is an interface for transmitting and receiving signals to and from the communication device 11.

The main memory 112 is a rewritable nonvolatile memory device such as a flash memory, a FeRAM (Ferroelectric Random Access Memory) or a EPROM (Erasable Programmable Read Only Memory). The main memory 112 stores a main program in the program storage area 113. The main program is a program for realizing a function for executing the operation of the respiratory assistance system 1 in which the semiconductor device 100 is mounted. The main program includes a function using external communication for transmitting and receiving signals via the external communication interface 111.

The abnormality detection circuit 114 detects abnormality processing such as unauthorized accesses from signal processing performed in the main control device 110, and generates a trigger signal based on the detection. The trigger signals generated by the abnormally detecting circuit 114 are not generated by software, but by hardware settings in the main control device 110.

Figure 3:
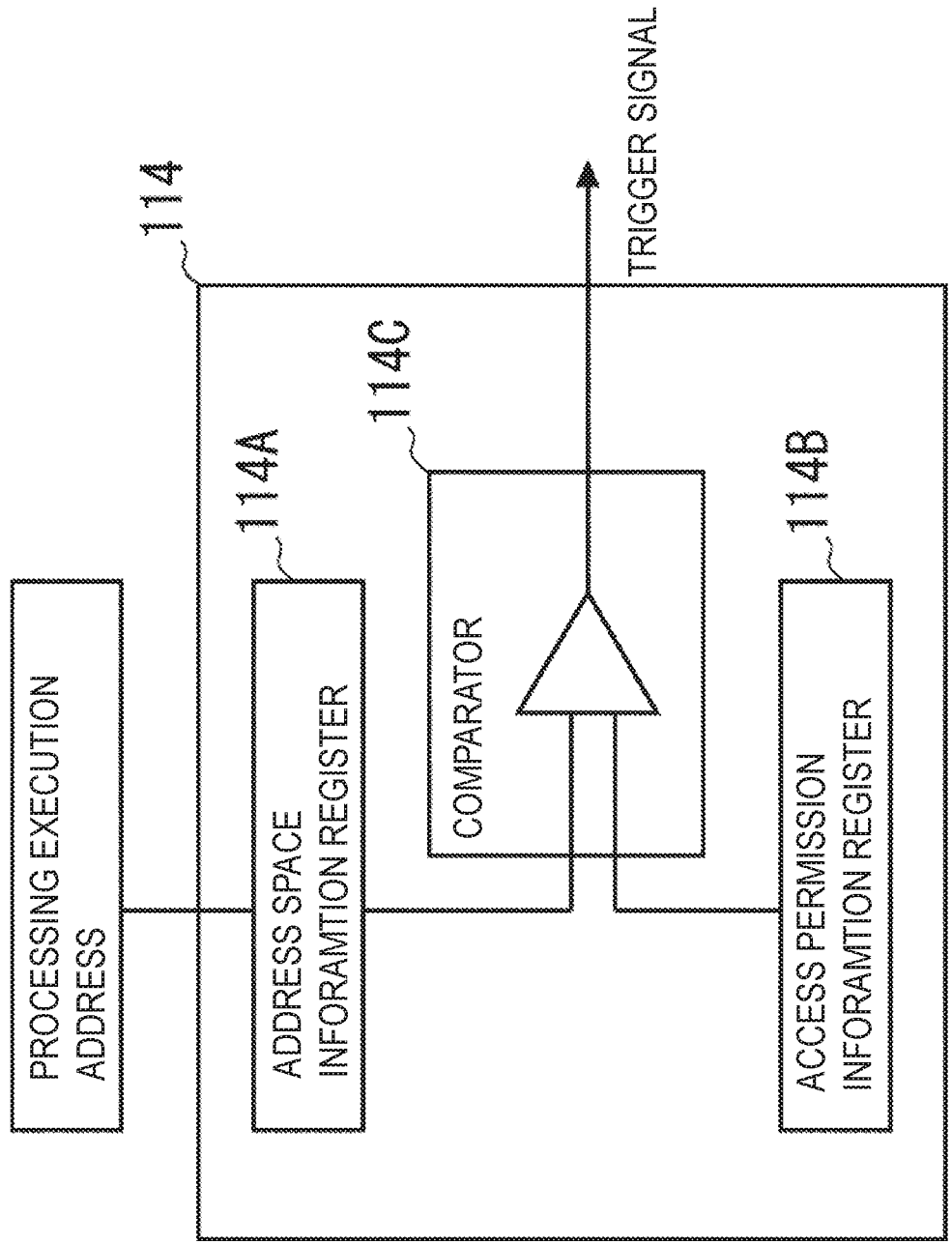
FIG. 3 is a diagram showing a specific example of an abnormality detecting circuit according to the first embodiment.

A specific example of the abnormality detection circuit will be described with reference to FIG. 3. FIG. 3 is a diagram showing a specific example of an abnormality detecting circuit according to the first embodiment. The abnormality detecting circuit 114 acquires a signal relating to the operation execution address from the region where the processing is being executed, and outputs a trigger signal indicating that the abnormality processing is being executed when the address where the processing is being executed does not receive the access permission.

The abnormality detecting circuit 114 mainly includes an address space information register 114A, an access permission information register 114B, and a comparator 114C. The address space information register 114A acquires a signal relating to the processing execution address, and outputs a signal relating to the address space corresponding to the acquired signal to the comparator 114C. The access permission information register 114B stores information whether or not access is permitted for each address space of the main control device 110. The comparator 114C compares the information on the address space corresponding to the address on which the processing has been performed with the information on the access permission to the address space, and outputs a trigger signal when the accessed address space is not permitted to be accessed.

The abnormality detecting circuit 114 shown in FIG. 3 is also referred to as a memory protection unit or an area protection unit, for example. The anomaly detecting circuit 114 monitors the addresses accessed in the process of signals, such as executing instructions, reading or writing, in the main control device 110. With such a configuration, since the abnormality detecting circuit 114 outputs the trigger signal from the signal of the address where the processing is being executed, the abnormality signal processing can be detected by hardware (circuit wiring) without intervention of software.

Figure 4:
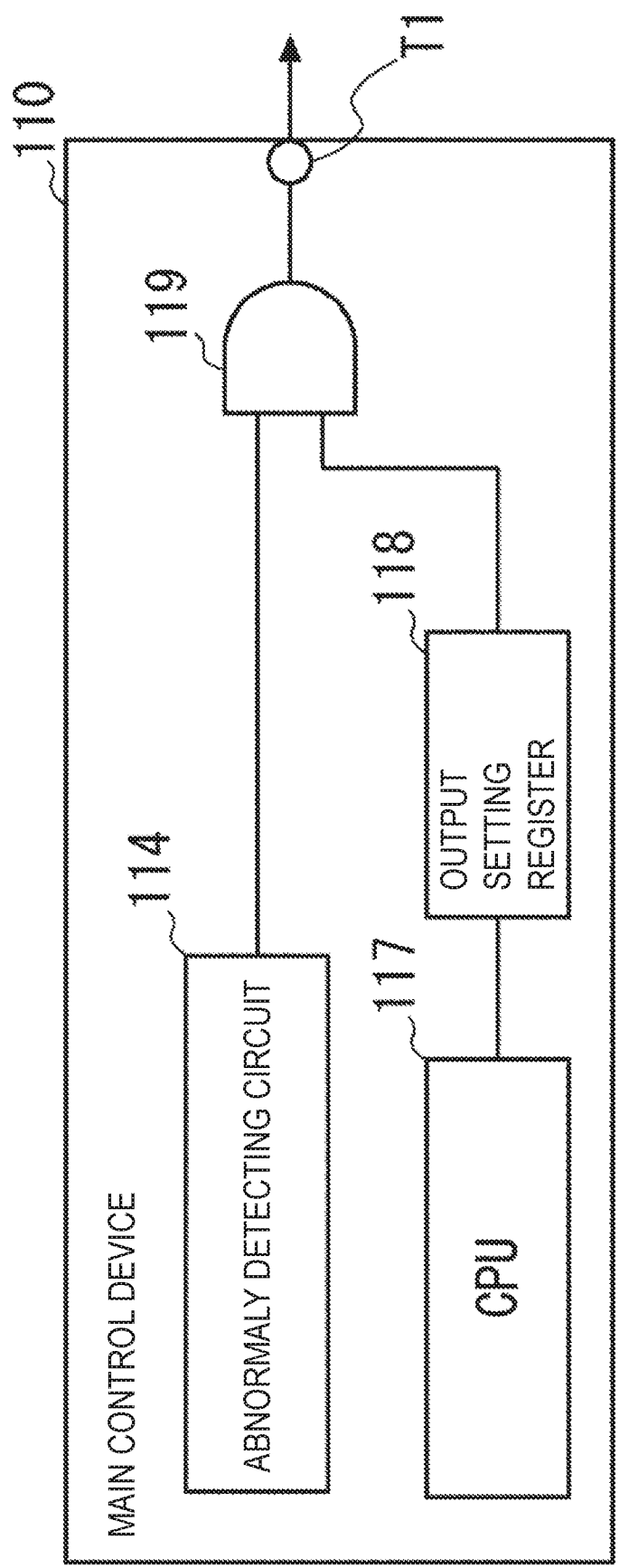
FIG. 4 is a diagram showing an example of the configuration of the abnormal detection circuit in the main control device.

Next, referring to FIG. 4, an exemplary configuration of the abnormality detecting circuit 114 in the main control device 110 will be described. FIG. 4 is a diagram showing an example of the configuration of the abnormal detection circuit in the main control device. In FIG. 4, the main control device 110 includes an anomaly detecting circuit 114, a CPU 117, an output setting register 118, a logical circuit 119, and a terminal T1.

As described with reference to FIG. 3, the abnormally detecting circuit 114 supplies a trigger signal to the logic circuit 119 when the abnormality signal processing is detected. The CPU 117 is an arithmetic unit of the main control device 110, and supplies a predetermined signal to the output setting register 118. Here, the predetermined signal is a signal when the CPU 117 detects an anomaly in accessing. When output setting register 118 receives a predetermined signal from the CPU 117, output setting register 118 generates a trigger signal in response to the predetermined signal, and provides the generated trigger signal to logic circuit 119.

The logic circuit 119 receives trigger signals from the abnormally detecting circuit 114 and the output setting register 118, respectively, and transmits the logical sum of the received trigger signals to the terminal T1. With such a configuration, the main control device 110 can directly transmit the trigger signal from the abnormality detecting circuit 114 to the terminal T1 and output the trigger signal, or can output the trigger signal by a signal generated by the CPU 117. It should be understood that the trigger signals outputted from the anomaly detecting circuit 114 may be amplified by amplifiers or may be outputted through a protective circuit including a noisy filtering or diodes.

Returning to FIG. 2, the configuration of the main control device 110 will be described. The trigger signal outputting circuit 115 outputs a trigger signal to the sub-control device 120. That is, the trigger signal outputting circuit 115 includes a terminal which is an interface for supplying a trigger signal from the main control device 110 to the sub-control device 120.

After receiving the request signal from the request circuit 122 of the sub-control device 120, the responding circuit 116 outputs a response signal to the request signal to the sub-control device 120. The responding circuit 116 also acquires a sub-program supplied from the sub-control device 120 after outputting a response signal.

Next, the sub-control device 120 will be described. The sub-control device 120 is connected to the main control device 110, and supplies a sub-program to the main control device 110 when the main control device 110 detects abnormal signal processing according to a preset condition. The sub-control device 120 includes a trigger signal obtaining circuit 121, a requesting circuit 122, a sub-program outputting circuit 123, and a sub-memory 124.

The trigger signal acquiring circuit 121 acquires the trigger signal output from the trigger signal output circuit 115 of the main control device 110. The trigger signal acquisition circuit 121 includes a terminal which is an interface for receiving a trigger signal. The trigger signal acquisition circuit 121 also has a function of receiving a trigger signal to perform interrupt processing and start processing of the request circuit. When the trigger signal acquiring circuit 121 obtains the trigger signal from the main control device 110, the request circuit 122 outputs a request signal requesting the main control device 110 to transfer the sub-program. The sub-program outputting circuit 123 transfers the subprogram to the main control device 110 when the response signal is received from the main control device 110.

The sub-memory 124 is a rewritable nonvolatile memory device such as a flash memory or a non-rewritable nonvolatile storage device such as a mask ROM (Read-Only Memory). The sub-memory 124 stores a sub-program in the program storage area 125. The sub-program is a program in which at least the function of external communication is deleted from the main program. That is, when the breathing assistance system 1 executes the sub-program, external communication is not performed.

Figure 5:
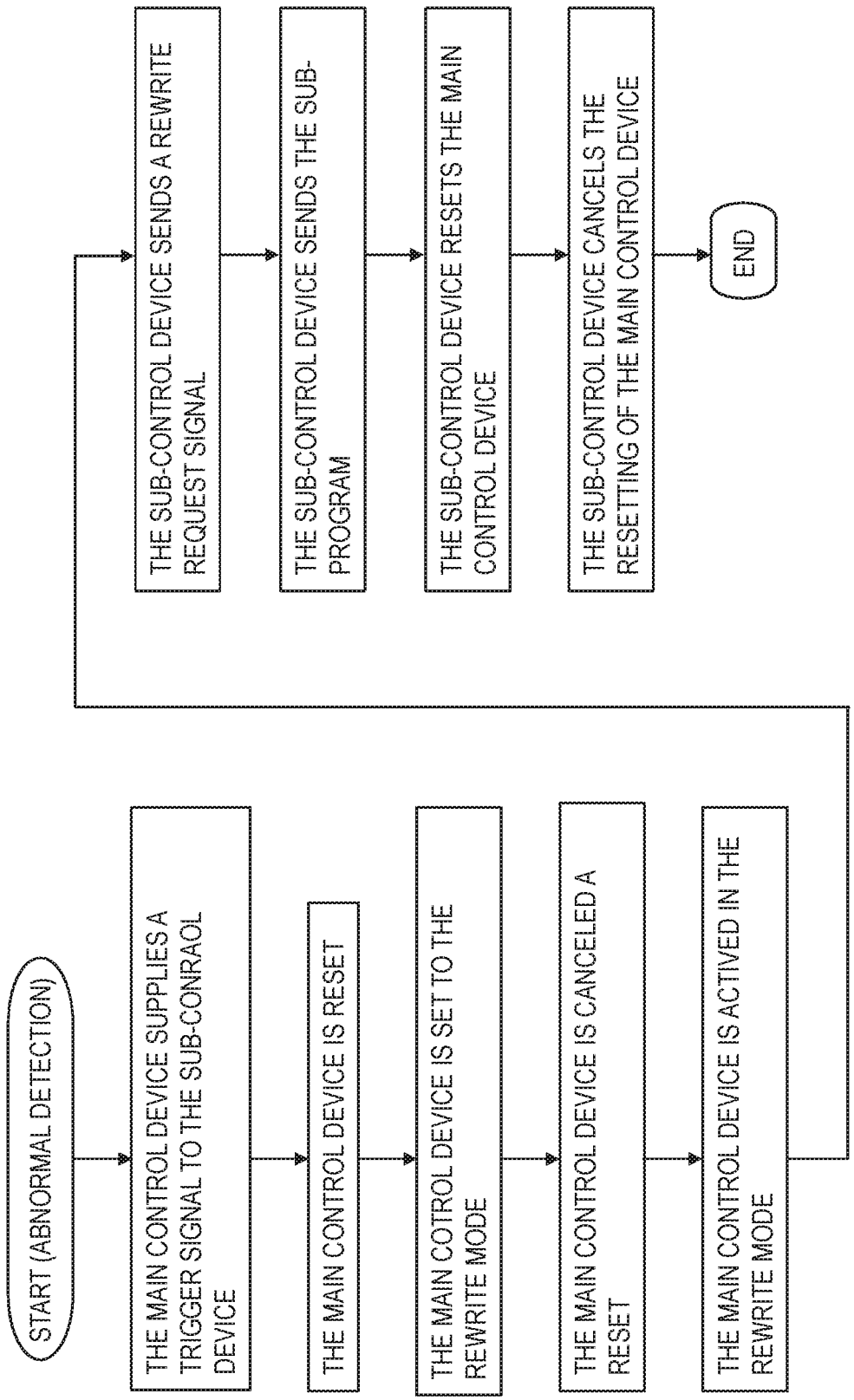
FIG. 5 is a flow chart showing the semiconductor device process for first embodiment.

Next, FIG. 5 shows a process when the semiconductor device 100 detects abnormal signal processing. FIG. 5 is a flow chart showing the semiconductor device process for first embodiment. The process shown in the figure is referred to as a main program rewriting routine S10. The main program rewrite routine S10 is started when the semiconductor device 100 detects an abnormal signal process. In other words, for example, the main control device 110 receives unauthorized access via the network 900, and when the abnormality detecting circuit 114 detects the abnormality signal processing by the unauthorized access, the process shown in FIG. 5 is started.

First, when the abnormality detecting circuit 114 detects an access abnormality, the main control device 110 supplies trigger signals to the sub-control device 120 in operation S11. Upon receiving the trigger signals, the sub-control device 120 starts an interrupt process.

The sub-control device 120 then provides resetting signals to the main control device 110. Upon receiving the reset signal from the sub-control device 120, the main control device 110 stops executing the main program of the main control device 110 and resets the main control device 110 in operation S12.

In operation S13, the sub-control device 120 sets the main control device 110 to the rewrite mode. Specifically, the sub-control device 120 supplies signals from Lo to Hi (or from Hi to Lo), for example, to predetermined program-rewriting terminals of the main control device 110. As a result, the main control device 110 transitions to the program-rewrite mode.

Next, the sub-control device 120 cancels resetting of the main control device 110 (S14). In operation S15, the main control device 110 is activated in the rewrite mode by canceling the resetting operation by the sub-control device 120.

In operation S16, the sub-control device 120 sends a rewrite request signal to the main control device 110. In operation S17, the sub-control device 120 sends the sub-program to the main control device 110. In this instance, the sub-control device 120 waits for the main control device 110 to return a response signal in response to the request signal, receives the response signal from the main control device 110, and then shifts to the following steps.

In operation S17, the sub-control device 120 sends the sub-program to the main control device 110. Upon receiving the sub-program from the sub-control device 120, the main control device 110 stores the sub-program in the program storage area 113 of the main memory 112. At this time, the main control device 110 erases the main program and stores the sub-program. That is, the program in the program storage area is rewritten from the main program to the sub program. As a result, the semiconductor device 100 stores a secure sub-program in the main memory instead of a program that may have been tampered with by unauthorized accesses.

Next, after the sub-program is stored in the main memory 112, the sub-control device 120 resets the main control device 110 in operation S18. In operation S19, the sub-control device 120 cancels the program rewrite mode and cancels the resetting of the main control device 110. When the resetting is canceled, the main control device 110 starts the operation of the rewritten subprogram.

The rewriting process of the programs in the semiconductor device 100 has been described above. In step S17, a process of transmitting the sub-program after a preset time has elapsed may be performed without receiving the response signal.

Figure 6:
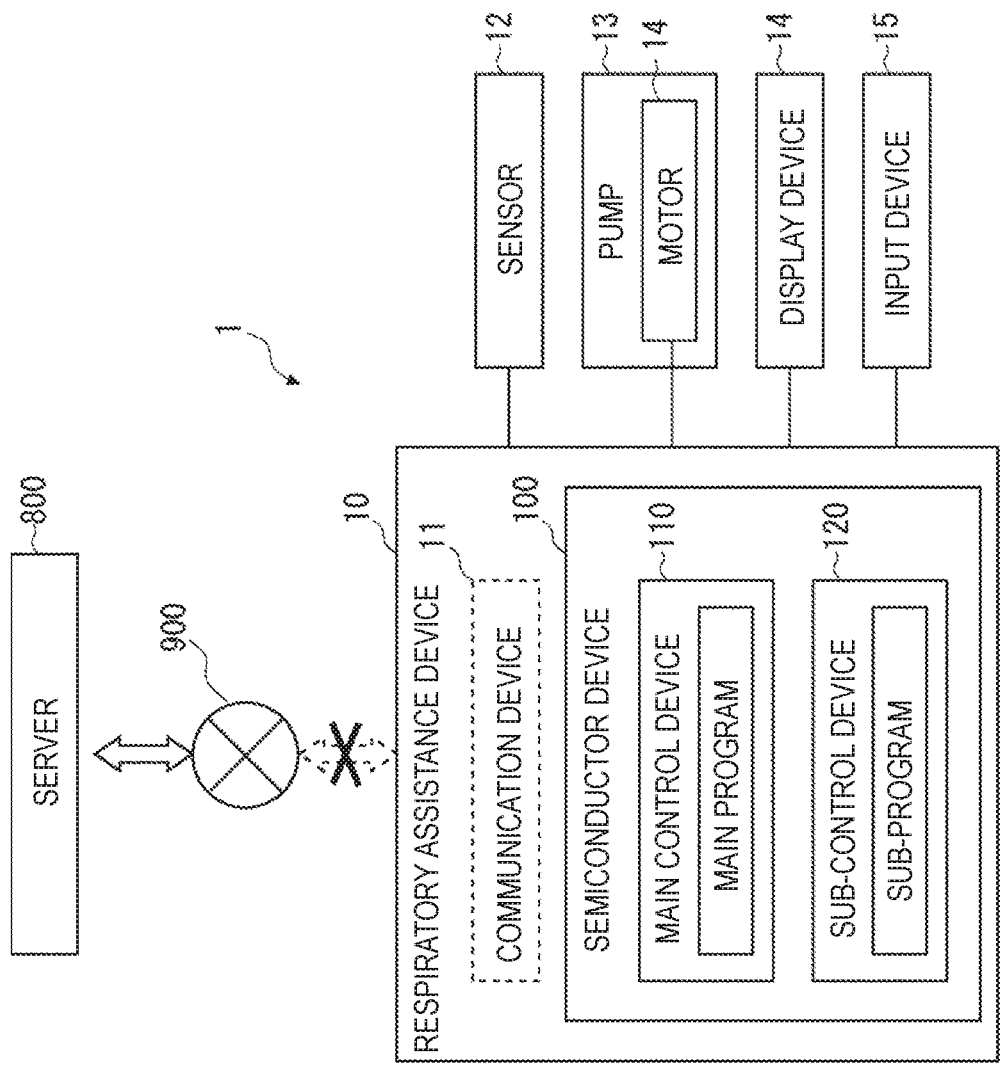
FIG. 6 is a diagram showing the state after programmatic rewriting of the respiratory assistance systems according to the first embodiment.

Next, with reference to FIG. 6, a system after the above-described program rewriting process is performed will be described. FIG. 6 is a diagram showing the state after programmatic rewriting of the respiratory assistance systems according to the first embodiment.

In the respiratory assistance system 1 shown in FIG. 6, the program of the main control device 110 is rewritten from the main program to the sub-program. As a result, the operation of the communication device 11 of the respiratory assistance system 1 is stopped. Therefore, the breathing assistance system 1 is in a state in which external communication via the network 900 cannot be performed. In addition, the breathing assistance system 1 can exert the same function as before the program is rewritten, except for the external communication. Therefore, the respiratory assistance system 1 can eliminate risks such as software falsification and maintain its function as a respiratory assistance device even after receiving some unauthorized access from outside.

Figure 7:
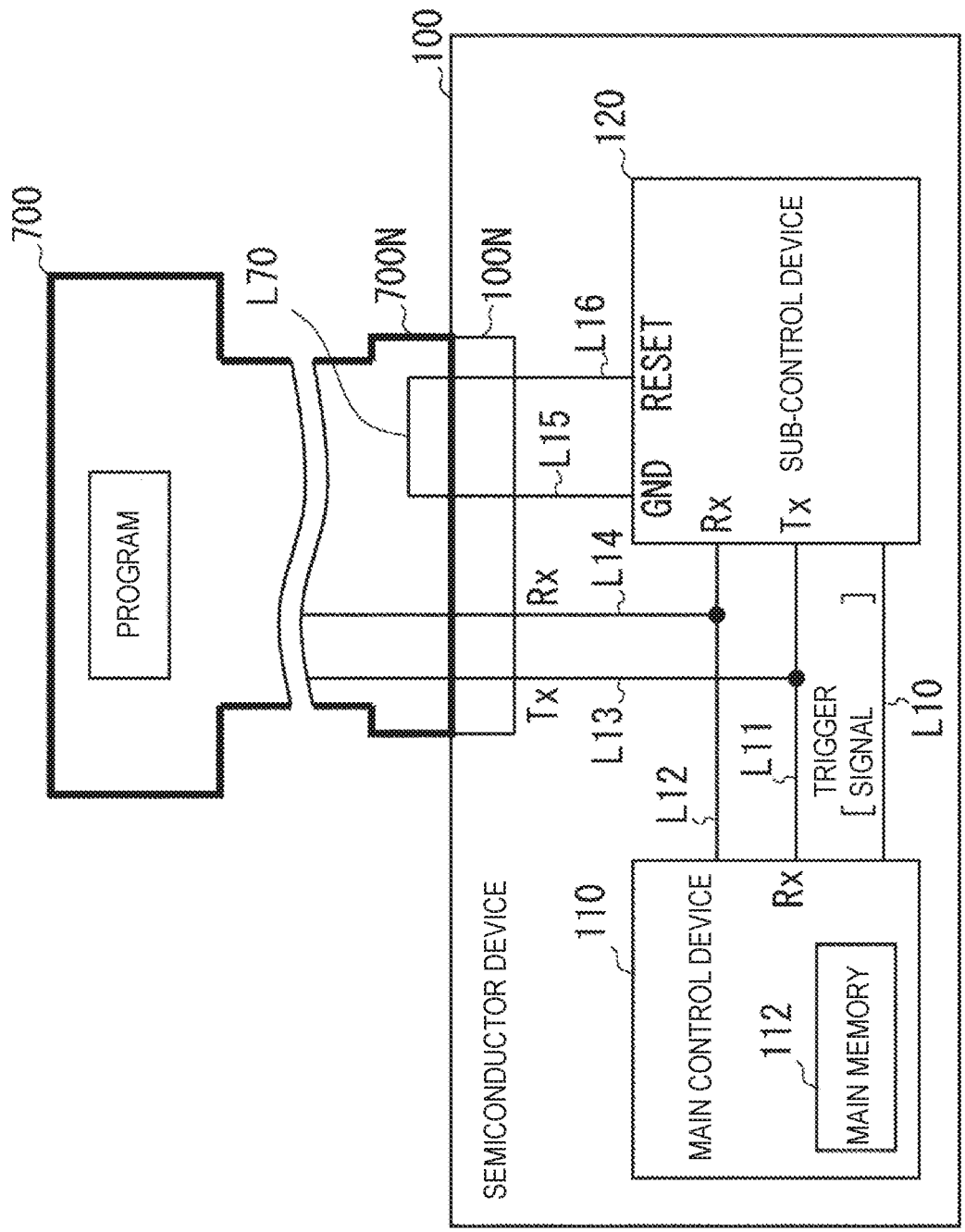
FIG. 7 is a diagram showing connection of the semiconductor device and the rewrite device according to the first embodiment.

Next, referring to FIG. 7, a configuration in which programs of the main control device 110 are rewritten from the outside will be described. FIG. 7 is a diagram showing connection of the semiconductor device and the rewrite device according to the first embodiment. In the drawing, the semiconductor device 100 has a connector 100N, and the connector 100N is connected to the rewrite device 700. The configurations of the semiconductor device 100 are connected by inner wirings L10 to L16.

The inner wirings of the semiconductor device 100 will be described below. The inner wiring L10 is a wiring for the main control device 110 to supply trigger signals to the sub-control device 120. The inner wiring L11 is a wiring for performing communication in which the main control device 110 is on the receiving side (Rx) and the sub-control device 120 is on the transmitting side (Tx). The inner wiring L12 is a wiring for performing communication in which the main control device 110 is on the transmitting side (Tx) and the sub-control device 120 is on the receiving side (Rx). The main control device 110 can receive a sub-program from the sub-control device 120 via the inner wirings L10 to L12.

The internal wiring L13 is a wiring connecting the internal wiring L11 and the connector 100N. When the program is supplied from the rewrite device 700 to the main control device 110, the program or the like is transmitted from the rewrite device 700, which is the transmitting side (Tx), to the main control device 110, which is the receiving side (Rx), via the inner wirings L13 and L11.

The internal wiring L14 is a wiring connecting the internal wiring L12 and the connector 100N. When programs are supplied from the rewrite device 700 to the main control device 110, reply signals and the like are transmitted from the main control device 110 on the transmitting side (Tx) to the rewrite device 700 on the receiving side (Rx) via the inner wirings L14 and L12.

The inner wiring L15 connects the GND terminal of the sub-control device 120 and the connector 100N. The inner wiring L16 connects the reset terminal of the sub-control device 120 to the connector 100N.

Next, the rewrite device 700 will be described. The rewrite device 700 is a device connected to the semiconductor device 100 for rewriting programs to the main control device 110. The rewrite device 700 has a connector 700N detachable from the connector 100N of the semiconductor device 100, and is connected to the wires L13 to L16 so as to be energizable.

The rewrite device 700 has a wiring L70 that connects the wiring L15 and the wiring L16. Therefore, when the rewrite device 700 is connected to the semiconductor device 100, the reset terminal of the sub-control device is fixed to the potential of the ground terminal. As a result, the sub-control device 120 is reset and does not transmit and receive signals to and from the main control device 110. Note that the potential of the GND terminal is fixed to the GND terminal as an example, and the potential of the wire L15 may be determined so that at least the Rx terminal and the Tx terminal of the sub-control device 120 are in a high-impedance state.

After the sub-control device 120 is reset, the rewrite device 700 transmits and receives predetermined signals to and from the main control device 110 via the wires L13 and L14, and transmits programs stored in the rewrite device 700 to the main control device 110. Upon receiving the program from the rewrite device 700, the main control device 110 stores the received program in the main memory. With the above configuration, the semiconductor device 100 can rewrite the program stored in the main control device 110 by the rewriting device 700 even after the program of the main control device 110 is rewritten to the sub-program and no external communication is performed.

Although the first embodiment has been described above, the configurations of the breathing assistance system 1 according to the first embodiment and the semiconductor device 100 included in the breathing assistance system 1 are not limited to the above-described configurations. For example, the functions of the communication device 11 may be included in the semiconductor device 100. Instead of the communication device 11, the respiratory assistance device 10 may include an external signal reception device for receiving an external signal. The external signal reception device is a device that receives a signal inputted to the respiratory assistance device 10 and supplies the received signal to the semiconductor device 100, and is, for example, a memory card reader, a bus communication connector, or the like. When the respiratory assistance device 10 has such a configuration, the external communication interface 111 included in the semiconductor device 100 has a function of receiving a signal corresponding to the external signal reception device. When the respiratory assist device has such a configuration, the sub-program stored in the sub-control device has a function of not accepting external signals instead of a function of not accepting external communications.

The semiconductor device 100 described in the first embodiment is applicable not only to the respiratory assistance system 1 but also to any device and system using a communication function. For example, the semiconductor device 100 according to the first embodiment is applicable to various devices called IoT (Internet of Things). The semiconductor device 100 according to the first embodiment can be applied to a mobile phone having a communication function, a home appliance, a business device, a medical device, and the like.

The sub-control device 120 may be an arithmetic device having the same configuration as that of the main control device 110, but the sub-control device 120 may select an integrated circuit having a relatively smaller circuit size than that of the main control device 110. With such a configuration, it is possible to provide a semiconductor device or the like that protects the semiconductor device from abnormality process due to unauthorized accesses and maintains required functions while suppressing increases in costs. The external communication is not limited to the above examples, and may be a communication conforming to a standard such as Bluetooth (registered trademark), USB (Universal Serial Bus), or Wi-Fi direct, which is not via a public network line.

In the respiratory assistance system 1 according to the first embodiment, if the main control device 110 is attacked by unauthorized accesses through external communication, the reliability of the software operating inside the main control device 110 is not guaranteed. Therefore, after the abnormality detecting circuit 114 detects the abnormality signal processing, processing for outputting a trigger signal by hardware without intervention of software is performed. With such a configuration, the first embodiment can reliably notify the sub-control device of an anomaly caused by an attack from the outside of the system. The sub-program stored in the main control device 110 instead of the main program after detecting the abnormal signal processing is a sub-program in which the communication function is deleted from the main program. As a result, the breathing assistance system 1 can eliminate the possibility of being attacked via communication, while reliably maintaining and continuing the function that should function originally. Therefore, according to the first embodiment, it is possible to provide a semiconductor device or the like for maintaining a required function while suppressing unauthorized accesses.

Figure 8:
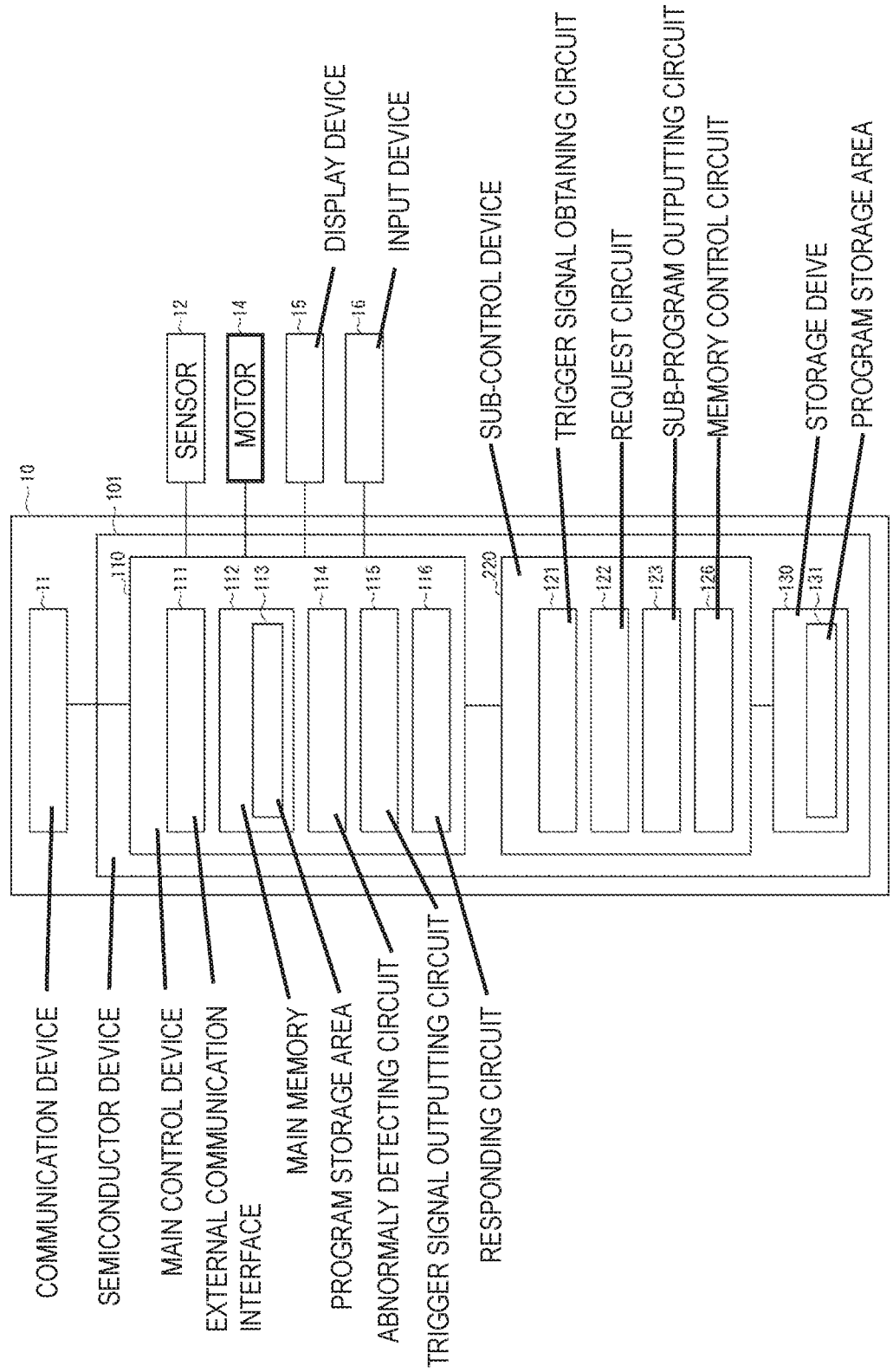
FIG. 8 is a summary diagram of the semiconductor device for the modified example of the first embodiment.

Next, referring to FIG. 8, the modified example of first embodiment will be described. FIG. 8 is a summary diagram of the semiconductor device for the modified example of the first embodiment. The respiratory assistance system 1 shown in FIG. 8 differs from the semiconductor device 100 shown in FIG. 2 in the configuration of the semiconductor device 101.

The semiconductor device 101 includes a main control device 110, a sub-control device 220, and a storage device 130. The sub-control device 220 differs from the first embodiment sub-control device 120 in that it has memory control circuit 126 instead of the sub-memory 124. The memory control circuit 126 reads a predetermined information from the storage device 130 connected to the sub-control device 120, and supplies the read information to the sub-program outputting circuit 123.

The storage device 130 is a storage device having a program storage area 131, and is a non-rewritable non-volatile memory. Non-rewritable nonvolatile memories are, for example, PROM (Programmable Read Only Memory) and a mask ROM. The storage device 130 is connected to the sub-control device 220 and supplies a predetermined information to the sub-control device 220 in response to a request from the memory control circuit 126.

Since the storage device 130 is composed of a non-rewritable non-volatile memory, the main program of the main control device 110 can be surely rewritten to a sub-program prepared in advance when the semiconductor device 100 receives unauthorized accesses.

Further, according to the modified example of the first embodiment, since the sub-control device 220 does not include a sub-memory for storing a main program, it can be configured to be relatively inexpensive. Therefore, according to the modified example of the first embodiment, it is possible to provide a semiconductor device or the like for maintaining a required function while suppressing unauthorized accesses.

Figure 9:
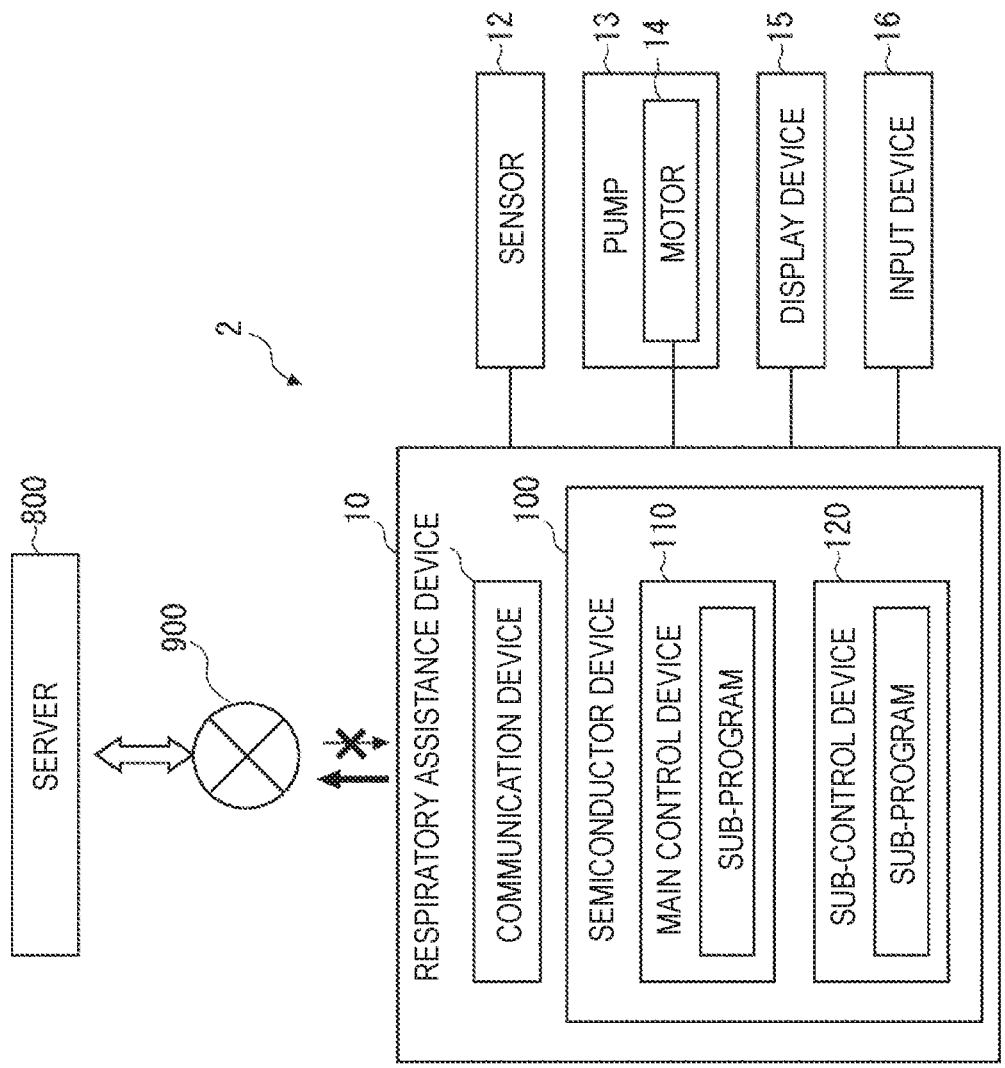
FIG. 9 is a diagram showing the state after programmatic rewriting of the respiratory assistance device according to the second embodiment.

Next, referring to FIG. 9, the second embodiment will be described. FIG. 9 is a diagram showing the state after programmatic rewriting of the respiratory assistance device according to the second embodiment. The respiratory assistance system 2 according to the second embodiment differs from the respiratory assistance system 1 according to the first embodiment in the functions realized by the subprogram after receiving unauthorized access. More specifically, the respiratory assistance system 2 is limited to a function in which the communication device is set in advance by the main control device 110 rewritten to a sub-program.

After the main control device 110 detects abnormal signal process due to unauthorized accesses, the respiratory assistance system 2 receives a sub-program from the sub-control device 120, stores the received sub-program in the main control device 110, and restarts the main control device 110. The sub-program has control commands for fixing the operation of the communication device 11 to the following operation set in advance, instead of the function of controlling the communication device 11 that the main program has executed.

First, the main control device 110 instructs the communication device 11 to transmit information indicating that the abnormal signal process has been detected to a preset external device (e.g., a managing device). Here, a specified mode performed by the breathing assistance system 2 may be an arbitrary mode as long as it is preset with respect to the receiving side.

On the other hand, the main control device 110 instructs the communication device 11 not to transmit any signals coming via the networks 900 to the main control device 110. As a result, the main control device 110 rewritten to the sub-program does not accept signals from the outside. Therefore, the breathing assistance system 2 can avoid attacks from the outside.

The breathing assistance system 2 also specifies to the user that an abnormality has occurred by a sub-program executed after detecting the abnormality signal process. For example, the respiratory assistance system 2 displays on the display device 15 to inform the user that the abnormal signal process has been detected and thus a signal received from the outside has not been accepted.

With the above configuration, the respiratory assistance system 2 related to the second embodiment can appropriately notify the external system (e.g., the server 800 used by the administrator) and the user of the system abnormalities while avoiding unauthorized accesses from the outside.

It should be noted that the communication device 11 can receive instructions from commands generated by the sub-program as described above to indicate that an abnormality has occurred with respect to the outside, but can also be realized by other configurations. For example, the communication device 11 may be configured to receive a trigger signal from the main control device 110 and to implement the functions described above in response to the received trigger signal. With such a configuration, since the breathing assistance system 2 can exhibit a function of not accepting communication from the outside after receiving unauthorized access and before rewriting the program, it is possible to quickly avoid attack from the outside. The communication device 11 may be included in the semiconductor device 100, or the main control device 110 may have the function of the communication device 11.

Figure 10:
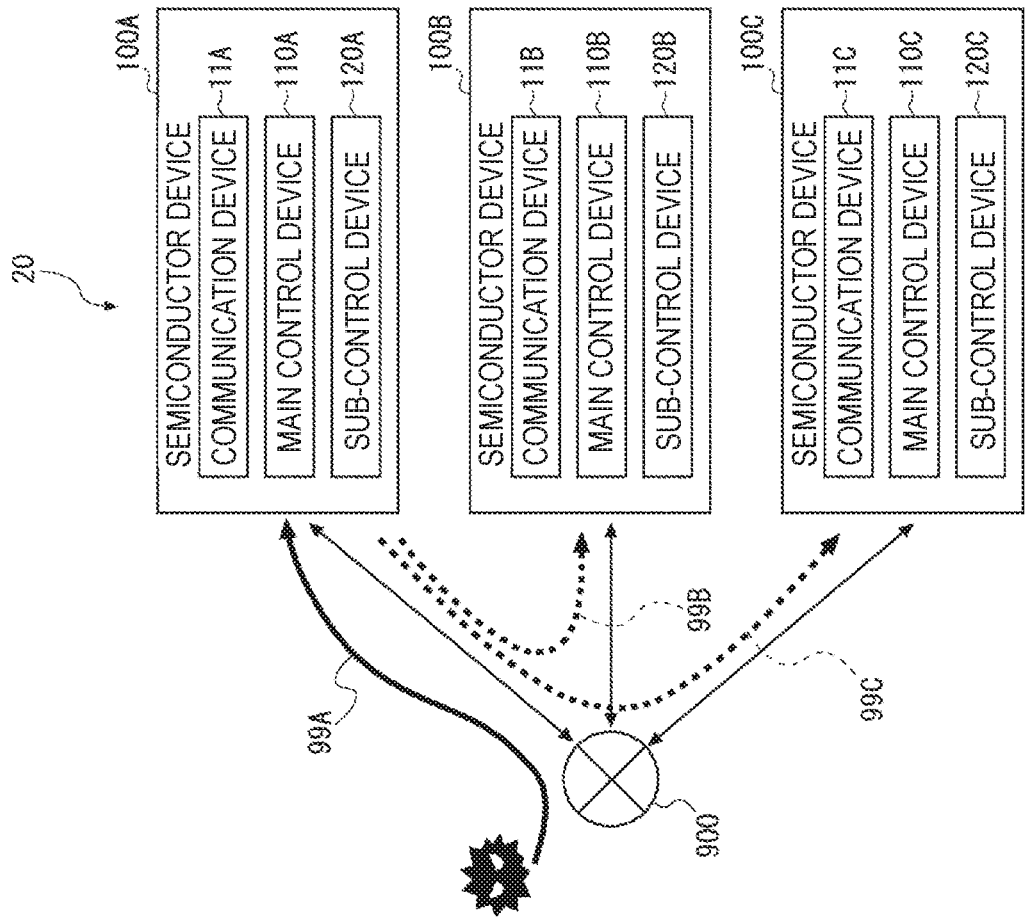
FIG. 10 is a schematic configuration diagram of a semiconductor system according to the modified example of second embodiment.

Next, the modified example of second embodiment will be explained. FIG. 10 is a schematic configuration diagram of a semiconductor system according to the modified example of second embodiment. In the modified example of the second embodiment, a plurality of semiconductor device are communicably connected to each other via the networks 900.

In FIG. 10, Semiconductor Systems 20 has semiconductor device 100A, 100B, and 100C. The semiconductor device's 100A-100C are connected to the networks 900 and are communicably connected to each other.

The semiconductor device 100A includes a communication device 11A, a main control device 110A, and a sub-control device 120A as main components, and the respective components have configurations and functions equivalent to those of the semiconductor device 100 included in the respiratory assistance system 2 described with reference to FIG. 9. However, the communication device 11A has a function of notifying the other semiconductor device 100B and 100C of the detection of the abnormal signal process when the abnormal signal process is detected by receiving the unauthorized access.

Further, the semiconductor device 100A has a function of rewriting the programs of the main control device 110A by receiving the notification when the other semiconductor device 100B (or 100C) notifies the other semiconductor device 100B (or 100C) that the abnormal signal process has been detected. That is, the main control device 110A also outputs a trigger signal to the sub-control device 120A by receiving a signal specifying that the abnormal signal process has been detected from another semiconductor device. Such a function can be realized by, for example, a configuration in which the CPU 117 generates trigger signals under a predetermined condition as in the example shown in FIG. 4. The semiconductor device 100B and 100C have the same configuration and function as the semiconductor device 100A, respectively.

For example, as shown in FIG. 10, if semiconductor device 100A receives unauthorized access 99A via network 900, if the main control device 110 detect abnormal signal process by this unauthorized access, semiconductor device 100A notifies semiconductor device 100B that abnormal signal process has been detected through communication 99B. At the same time, the semiconductor device 100A notifies the semiconductor device 100C of the fact that the abnormal signaling process has been detected through the communication 99C. The semiconductor device 100B that has received the notification that the abnormal signal process has been detected from the semiconductor device 100A outputs the trigger signal to the sub-control device 120B by the main control device 110B. As a result, the semiconductor device 100B executes a process of rewriting the program of the main control device 110B into the sub-program. Similarly, the semiconductor device 100C executes a process in which the main control device 110C outputs trigger signals to the sub-control device 120C to rewrite the program of the main control device 110C to the sub-program.

Figure 11:
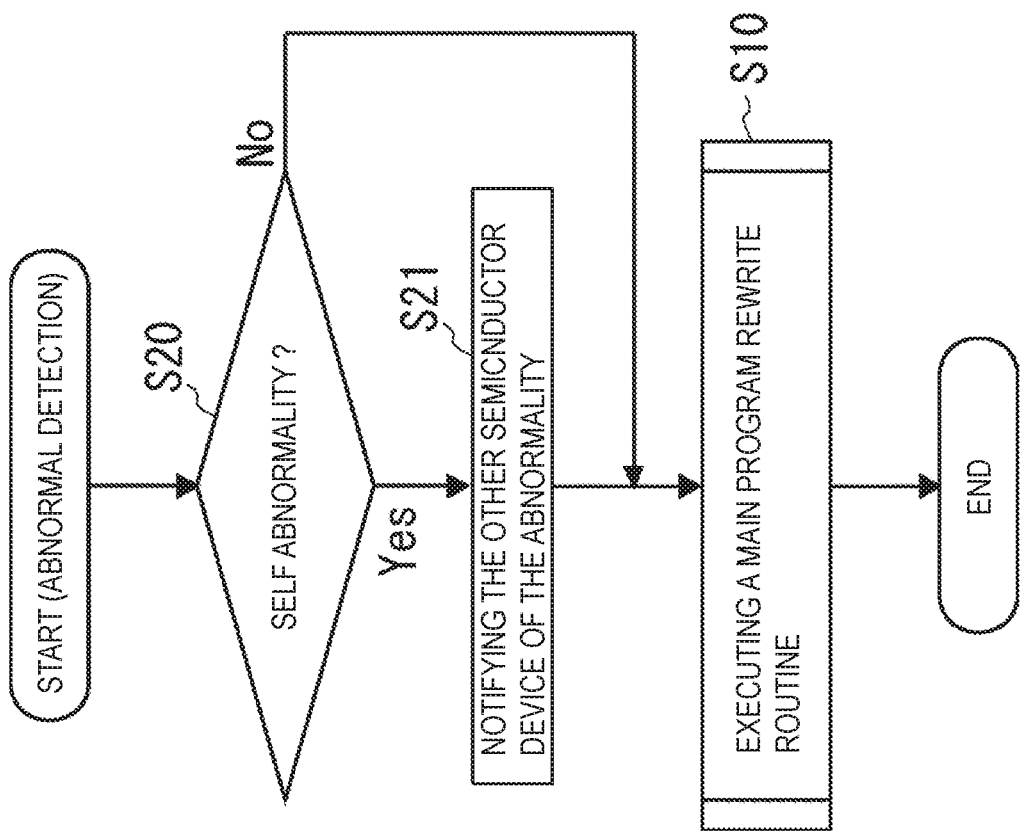
FIG. 11 is a flow chart showing the semiconductor device process according to the modified example of second embodiment.

Next, referring to FIG. 11, the modified example process of the second embodiment will be described. FIG. 11 is a flow chart showing the semiconductor device process according to the modified example of second embodiment. The semiconductor device constituting the semiconductor system 20 performs the process shown in the drawing. For convenience, the following description will be made as processing performed by the semiconductor device 100A, but the semiconductor device 100B and 100C also perform the same processing.

First, after detecting the abnormal signal process, the semiconductor device 100A determines whether or not the abnormal signal process to be outputted to the sub-control device 120A is due to the abnormal signal process detected by the main control device 110A of the semiconductor device 100A itself, that is, whether or not the abnormality is the abnormality of itself (step S20).

When it is determined that the abnormality is the own abnormality (step S20: YES), the semiconductor device 100A executes a transaction of notifying the other semiconductor device of the abnormality (step S21). Then, in order to rewrite its own main program, the main program rewrite routine S10 described with reference to FIG. 5 is executed (routine S10).

On the other hand, when the abnormal signal process is received from another semiconductor device, the semiconductor device 100A does not judge that the abnormal signal process is the abnormality of its own (step S20: NO). In this instance, the semiconductor device 100A executes a main program rewriting routine for rewriting its own main program without notifying other device (routine S10).

As described above, when any semiconductor device constituting the semiconductor system 20 receives unauthorized accesses and detects abnormal signal processing, the semiconductor system 20 notifies the other semiconductor device of the abnormal signal process and rewrites the programs of the respective semiconductor device. As a result, it is possible to avoid an unauthorized attack from the outside in advance, not only in the semiconductor device where an unauthorized access has been received, but also in the semiconductor device where an unauthorized access has not been received. That is, according to the modified example of the second embodiment, it is possible to provide a semiconductor device or the like for maintaining a required function while suppressing unauthorized accesses of the entire system.

Figure 12:
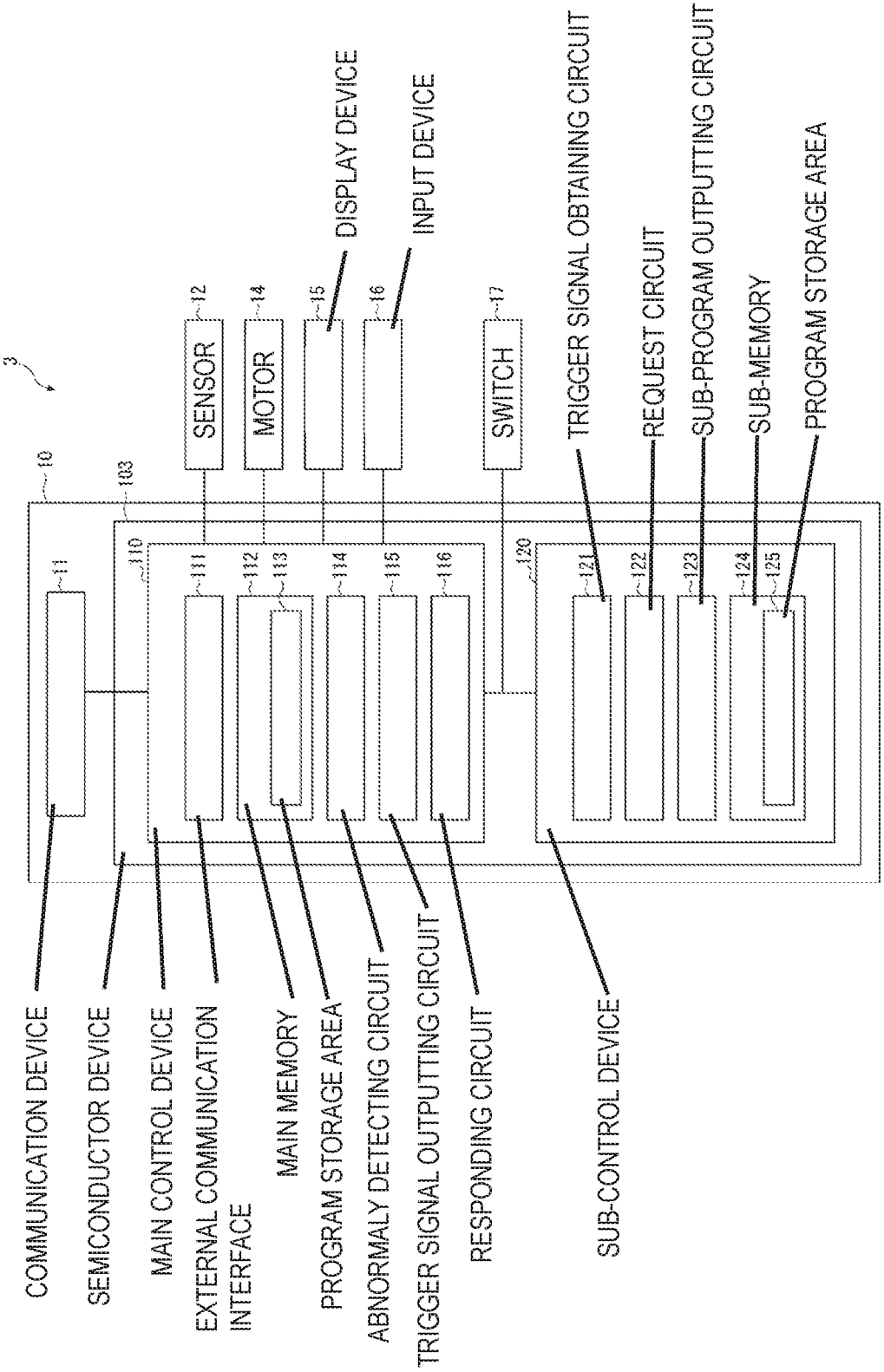
FIG. 12 is a schematic configuration diagram of the semiconductor device according to the third embodiment.

Next, third embodiment will be described. The structure of the respiratory assistance system 3 according to the third embodiment differs from its according to the first embodiment. FIG. 12 is a schematic configuration diagram of the semiconductor device according to the third embodiment.

The semiconductor device 103 according to the present embodiment differs from the semiconductor device 100 according to the first embodiment in that it has switches 17 between a main control device 110 and a sub-control device 120. The switch 17 is a switch for permitting or not permitting transmission of trigger signals outputted from the main control device 110 to the sub-control device 120.

Considering that the main control device 110 may have been tampered with by unauthorized accesses, the switches 17 are preferable configured so as not to be affected by the software operation of the main control device 110. That is, the switch 17 is, for example, a mechanical switch composed of a combination of mechanical components, or a switch composed of a combination of electrical components such as a transistor. In semiconductor device 103, the switch 17 is in an off state as an initial setting, i.e., a state in which the trigger signal output by the main control device 110 is not transmitted to the sub-control device 120. The switch 17 is in a state of transmitting trigger signals to the sub-control device 120 when the user accepts an operation of switching the state of the switch from off to on. That is, even when detecting the abnormal signal process, the semiconductor device 103 does not rewrite the program of the main memory 112 until the user performs the switch switching operation.

Figure 13:
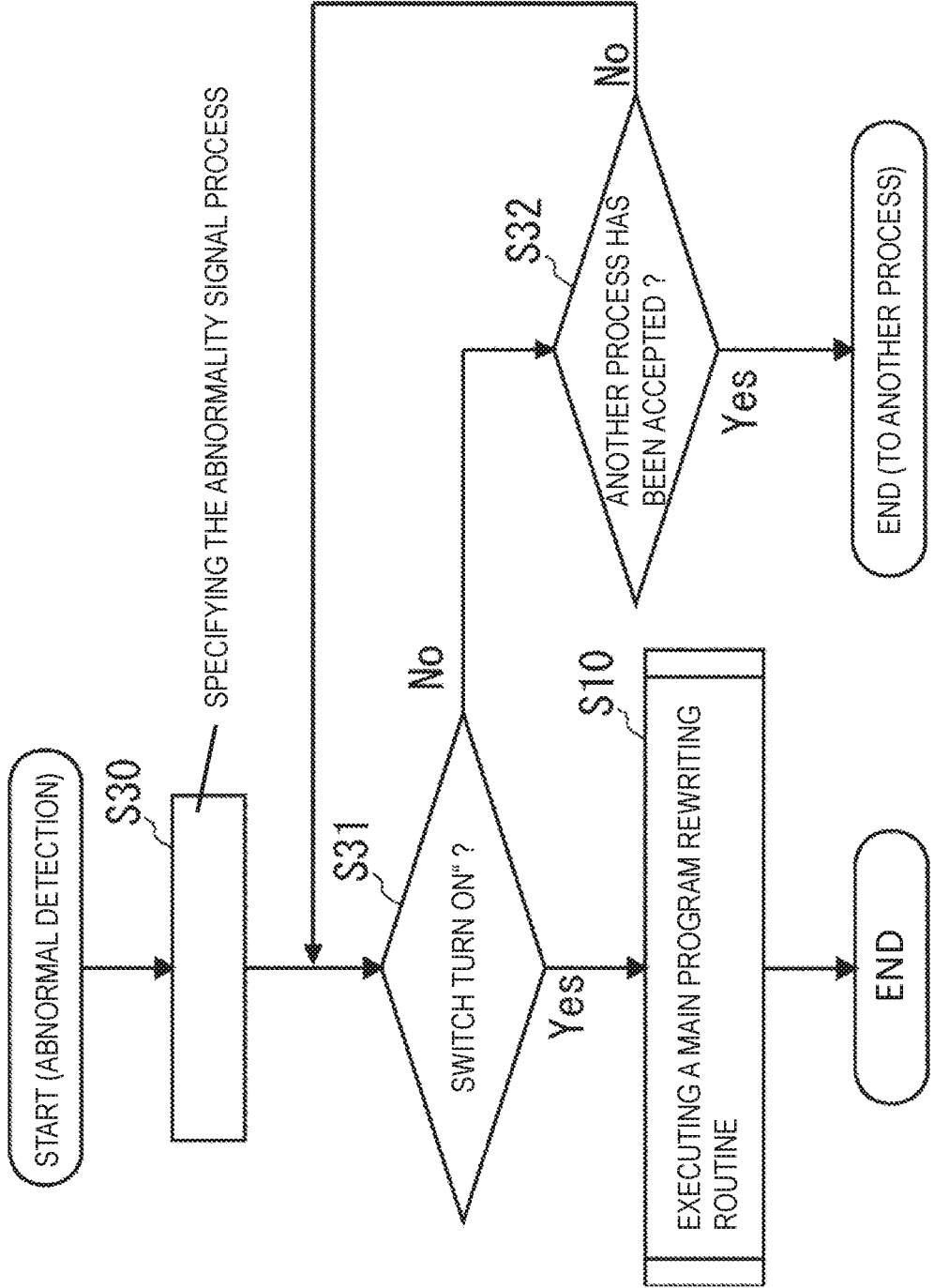
FIG. 13 is a flow chart showing the semiconductor device process according to third embodiment.

Next, referring to FIG. 13, the process of the semiconductor device according to the third embodiment will be described. FIG. 13 is a flow chart showing the semiconductor device process according to third embodiment. First, when the semiconductor device 103 detects the abnormality signal process, it performs processing for specifying the abnormality signal process in operation S30. Specifically, for example, when detecting the abnormal signal process, the semiconductor device 103 displays the fact that the abnormal signal process has been detected on the display device 15. Alternatively, the semiconductor device 103 notifies the user or the administrator of the fact that the abnormal signaling process has been detected via the communication device 11. As a result, the user or the like can select a process that differs from the process of rewriting the program executed by the main control device 110 into the sub-program.

Next, in operation S31, the semiconductor device 103 receives the operation of the switch 17, and determines the operation based on whether or not the switch 17 is turned on. That is, when the user turns on the switch (step S31: YES), the trigger signal of the semiconductor device 103 is transmitted from the main control device 110 to the sub-control device 120. As a result, the semiconductor device 103 executes the main program rewriting routine described above in step S10. After completing the main program rewriting routine S10, the semiconductor device 103 ends the process.

On the state hand, when the user does not turn on the switch (step S31: NO), the semiconductor device 103 determines whether another process has been accepted (step S32). Here, the other process is a process that differs from the process of rewriting the main program stored in the main control device 110 to the sub-program stored in the sub-control device 120. For example, the semiconductor device 103 can rewrite the programs of the main memories by the rewriting device 700 described referring to FIG. 7. That is, the user can connect the rewrite device 700 to the semiconductor device 103 instead of operating the switches 17. Alternatively, instead of operating the switches 17, the user can perform a process of diagnosing whether or not the semiconductor device 103 is tampered with. Alternatively, the user can perform an operation of shutting down the breathing assistance system 3 instead of operating the switch 17. When the semiconductor device 103 receives such another process (S32: YES), the process shown in the drawing is terminated, and the process proceeds to another process. On the other hand, when the semiconductor device 103 does not accept another process (step S32: NO), the process returns to step S31 and accepts the operation of the switches 17.

As described above, according to the process relating to the third embodiment, the semiconductor device 103 can provide the user with an opportunity to select a processing differing from the processing for rewriting the program executed by the main control device 110 into the sub-program. As a result, the semiconductor device 103 can perform checking, restoration, etc. of the main program without rewriting the main program of the main control device 110 to the sub-program. That is, the semiconductor device 103 can receive a restoration process or the like without deleting the communication function.

The third embodiment has been described above. According to the third embodiment, it is possible to provide a semiconductor device or the like which maintains a required function without fixing the processing after detecting the abnormal signal process such as the unauthorized access and while suppressing the occurrence of a system failure due to the unauthorized access or the like.

Also, the programs described above may be stored and provided to a computer using various types of non-transitory computer readable media. Non-transitory computer readable media includes various types of tangible storage media. Examples of non-transitory computer readable media include magnetic recording media (e.g., flexible disks, magnetic tapes, hard disk drives), magneto-optical recording media (e.g., magneto-optical disks), CD-ROM (Read Only Memory) CD-R, a CD-R/W, solid state memory (e.g., masked ROM, PROM, and EPROM (Erasable PROM), flash ROM, and RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Although the invention made by the inventor has been specifically described based on the embodiment, the present invention is not limited to the embodiment already described, and it is needless to say that various modifications can be made without departing from the gist thereof. That is, the semiconductor device described above can be applied to various devices having a communication function.

What is claimed is:

1. A semiconductor device comprising:
   a main control device comprising:
   a main memory for storing a main program for accepting an external signal; and
   a trigger signal output circuit for outputting a trigger signal when abnormal signal process differing from preset signal processing is performed; and
   a sub-control device coupled to the main control device, the sub-control device comprising:
   a trigger signal obtaining circuit for obtaining the trigger signal;
   a sub-program output circuit for outputting a sub-program to the main control device based on the obtained trigger signal; and
   a reset terminal for holding the sub-control device in a non-operating state,
   wherein the main control device includes a program update circuit for receiving an update of a program stored in the main memory when the sub-control device is in the non-operating state.

2. The semiconductor device according to claim 1, further comprising:
   an external signal obtaining circuit for obtaining the external signal that is provided by external communication, the external communication being communication with the outside.

3. The semiconductor device according to claim 2, wherein the external signal obtaining circuit obtains the external signal that is provided by the external communication using a public communication network.

4. The semiconductor device according to claim 2, wherein the external signal obtaining circuitry obtains the external signal provided by the external communication according to a predetermined standard.

5. The semiconductor device according to claim 1, wherein the sub-program output circuit in the sub-control device outputs, to the main control device, a sub-program that does not accept the external signal based on the obtained trigger signal.

6. The semiconductor device according to claim 1, wherein the sub-control device further includes a request circuit for outputting a request signal for requesting the main control device to transfer the sub-program when the sub-control circuit obtains the trigger signal.

7. The semiconductor device according to claim 6, wherein the main control device further includes a response circuit for outputting, to the sub-control device, a response signal in response to receiving the request signal from the sub-control device, and for obtaining the sub-program after outputting the response signal.

8. The semiconductor device according to claim 7, wherein the sub-program output circuit outputs the sub-program to the main control device when the sub-program output circuit receives the response signal from the main control device.

9. The semiconductor device according to claim 8, further comprising:
   a sub storage device for storing the sub-program,
   wherein the sub control device includes a memory control circuit for controlling the sub storage device, and for suppling the sub-program stored in the sub storage device to the sub-program outputting circuit.

10. The semiconductor device according to claim 1,
    wherein the main control device includes an abnormality detection circuit for changing an output voltage when the abnormality signal process is performed, and
    wherein the trigger signal output circuit outputs the trigger signal based on a voltage change of the abnormality detection circuit.

11. The semiconductor device according to claim 1, wherein the main control device rewrites the main program stored in the main memory to the sub program when the sub program is obtained.

12. The semiconductor device according to claim 11, wherein the main control device further comprises a specified circuit for outputting a specified signal specifying that the trigger signal has been output when the trigger signal is outputted.

13. The semiconductor device according to claim 12, wherein the specified circuitry transmits the specified signal to the outside via a communication device.

14. The semiconductor device according to claim 12, wherein the main control device outputs the trigger signal to the sub-control device by receiving the specified signal from another semiconductor device.

15. The semiconductor device according to claim 12, further comprising:
    a transmission switch for permitting transmission of the trigger signals to the sub-control device.

16. The semiconductor device according to claim 1, further comprising:
    a communication device for performing external communication and supplying the external signal to the main control device,
    wherein the main control device instructs the communication device not to supply the external signal to the main control device when the main program of the main memory is rewritten to the sub program.

17. The semiconductor device according to claim 16, wherein the main control device instructs the communication device to transmit a specified signal specifying that the main program of the main memory has been rewritten to the sub-program, the specified signal indicating that the main program has been rewritten to a preset destination, when the main program of the main memory has been rewritten to the sub-program.

18. A semiconductor system comprising:
    a plurality of semiconductor devices communicably coupled to each other, wherein the plurality of semiconductor devices each comprises:
    a main controller having, comprising:
    a main memory for storing a main program for receiving an external signal; and
    a trigger signal output circuit for outputting a trigger signal when a signal process different from a preset signal processing is performed; and
    a sub-controller coupled to the main controller, the sub-controller comprising:

a trigger signal obtaining circuit for obtaining the trigger signal;

a sub-program output circuit for outputting a sub-program to the main controller based on the obtained trigger signal; and a reset terminal for holding the sub-controller in a non-operating state, wherein the main controller includes a program update circuit for receiving an update of a program stored in the main memory when the sub-controller is in the non-operating state, and wherein one of the plurality of semiconductor devices transmits a notification based on the trigger signal to another semiconductor device.

19. A non-transitory computer readable medium storing a program that, when executed by a computer, causes the computer to perform a semiconductor device protecting method, the semiconductor device protecting method comprising:

a main program storage step for storing a main program for accepting an external signal in a main control device;

a sub program storing step for storing a sub program in a sub control device coupled to the main control device;

a trigger signal outputting step for outputting a trigger signal to the sub control device when a signal process different from a preset signal processing is performed in the main control device; and a sub program outputting step for outputting the sub program to the main control device based on the trigger signal in the sub control device, wherein the semiconductor device protecting method further includes a reset step for holding the sub control device in a non-operating state, and wherein, when the sub control device is in the non-operating state, an update of a program stored in the main memory is received.

* * * * *